(12) United States Patent
Luo et al.

(10) Patent No.: US 11,422,798 B2
(45) Date of Patent: Aug. 23, 2022

(54) CONTEXT-BASED WORD EMBEDDING FOR PROGRAMMING ARTIFACTS

(71) Applicant: International Business Machines Corporation, Armonk, NY (US)

(72) Inventors: Yan Luo, Concord (CA); Liujia Shao, Markham (CA); Yan Xu, Richmond Hill (CA); Sibin Fan, Markham (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 262 days.

(21) Appl. No.: 16/801,218

(22) Filed: Feb. 26, 2020

(65) Prior Publication Data

US 2021/0263732 A1    Aug. 26, 2021

(51) Int. Cl.
*G06F 8/73* (2018.01)
*G06N 3/08* (2006.01)
*G06F 8/77* (2018.01)
*G06F 8/75* (2018.01)

(52) U.S. Cl.
CPC ............ *G06F 8/73* (2013.01); *G06F 8/75* (2013.01); *G06F 8/77* (2013.01); *G06N 3/08* (2013.01)

(58) Field of Classification Search
None
See application file for complete search history.

(56) References Cited

U.S. PATENT DOCUMENTS

| 6,715,141 | B1 | 3/2004 | Hodge |
| 7,127,704 | B2* | 10/2006 | Van De Vanter ......... G06F 8/33 717/112 |
| 9,037,464 | B1* | 5/2015 | Mikolov ................. G10L 15/06 704/255 |

(Continued)

FOREIGN PATENT DOCUMENTS

| CN | 107562919 A | 9/2017 |
| CN | 108417210 A | 1/2018 |
| JP | 6467893 B2 | 2/2019 |

OTHER PUBLICATIONS

Bojanowski et al. "Enriching Word Vectors with Subword Information", Jun. 2017, Transactiuons of the Association for Computaional Linguistics, vol. 5, pp. 135-146. (Year: 2017).*

(Continued)

*Primary Examiner* — Jason D Mitchell
(74) *Attorney, Agent, or Firm* — Cantor Colburn LLP; Peter Wang

(57) ABSTRACT

Techniques for context-based word embedding for programming artifacts are described herein. An aspect includes determining a plurality of keywords based on a corpus of programming artifacts, the corpus of programming artifacts including source code corresponding to a software project. Another aspect includes determining a plurality of context/keyword pair sets based on the plurality of keywords and the corpus of programming artifacts, wherein each context/keyword pair set of the plurality of context/keyword pair sets includes a first keyword, a second keyword, and a context type corresponding to a co-occurrence of the first keyword and the second keyword in the corpus of programming artifacts. Another aspect includes constructing a word embedding matrix based on the plurality of context/keyword pair sets.

18 Claims, 3 Drawing Sheets

(56) References Cited

U.S. PATENT DOCUMENTS

| | | | |
|---|---|---|---|
| 9,454,522 B2 | 9/2016 | Bonnet et al. | |
| 10,162,613 B1* | 12/2018 | Vilozny | G06F 8/427 |
| 10,515,400 B2* | 12/2019 | Krishnamurthy | G06Q 30/0631 |
| 10,901,708 B1* | 1/2021 | Reas | G06F 8/42 |
| 2007/0016862 A1 | 1/2007 | Kuzmin | |
| 2013/0268916 A1* | 10/2013 | Misra | G06F 8/73 |
| | | | 717/123 |
| 2014/0282373 A1* | 9/2014 | Garza | G06F 8/51 |
| | | | 717/106 |
| 2017/0270100 A1* | 9/2017 | Audhkhasi | G06F 40/289 |
| 2018/0189265 A1 | 7/2018 | Chen et al. | |
| 2019/0065164 A1* | 2/2019 | Groseclose | G06Q 10/00 |
| 2019/0370273 A1* | 12/2019 | Frison | G06F 16/3347 |
| 2020/0104313 A1* | 4/2020 | Jayaraman | G06F 16/345 |
| 2020/0134442 A1* | 4/2020 | Sim | G06Q 10/06311 |
| 2021/0034707 A1* | 2/2021 | Podgorny | G06N 3/0454 |
| 2021/0256036 A1* | 8/2021 | Luo | G06F 16/285 |

OTHER PUBLICATIONS

Mikolov et al. "Efficient Estimation of Word Representations in VectorSpace", Sep. 2013, arXiv preprint arXiv: 1301.3781 (Year: 2013).*

Efstathiou et al. "Semantic Source Code Models Using Identifier Embeddings", 2019, IEEE/ACM 16th International Conference on Mining Software Repositories (MSR). (Year: 2019).*

* cited by examiner

CONTEXT-BASED WORD EMBEDDING FOR PROGRAMMING ARTIFACTS

BACKGROUND

The present invention generally relates to neural networks, and more specifically, to context-based word embedding for programming artifacts for use in conjunction with a neural network.

Natural language processing (NLP) is a field of computer science, artificial intelligence, and linguistics that, amongst other things, is concerned with using computers to derive meaning from natural language text. NLP systems may perform many different tasks, including, but not limited to, determining the similarity between certain words and/or phrases in natural language documents. One known way to determine the similarity between words and/or phrases is to compare their respective word embeddings. Generally speaking, a word embedding is a mapping of natural language text to a vector of real numbers in a low dimensional space (and is also sometimes referred to as a "vector representation").

Word embedding is the collective name for a set of feature representations in natural language processing where words or phrases from the vocabulary are mapped to vectors of real numbers in a low-dimensional space relative to the vocabulary size. Methods to generate this mapping include neural networks, dimensionality reduction on the word co-occurrence matrix, and explicit representation in terms of the context in which words appear. Word and phrase embeddings, when used as the underlying input representation, have been shown to boost the performance in natural language processing tasks such as syntactic parsing and sentiment analysis. Word embedding may be used for effective representations of vocabulary in natural language documents.

SUMMARY

Embodiments of the present invention are directed to context-based word embedding for programming artifacts. A non-limiting example computer-implemented method includes determining a plurality of keywords based on a corpus of programming artifacts, the corpus of programming artifacts including source code corresponding to a software project. The method also includes determining a plurality of context/keyword pair sets based on the plurality of keywords and the corpus of programming artifacts, wherein each context/keyword pair set of the plurality of context/keyword pair sets includes a first keyword, a second keyword, and a context type corresponding to a co-occurrence of the first keyword and the second keyword in the corpus of programming artifacts. The method also includes constructing a word embedding matrix based on the plurality of context/keyword pair sets.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
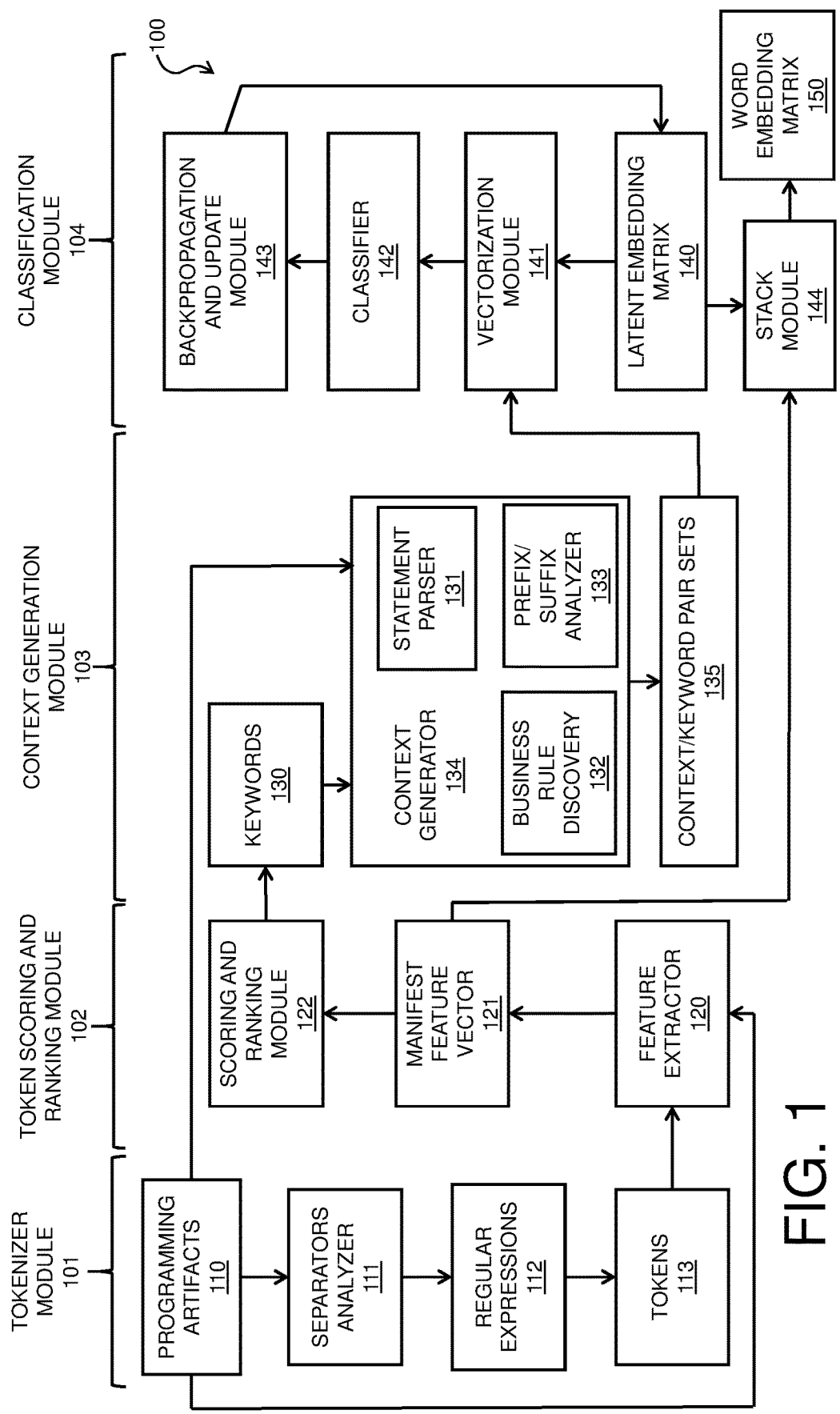
FIG. 1 is a block diagram of components of a system for context-based word embedding for programming artifacts in accordance with one or more embodiments of the present invention.

One or more embodiments of the present invention provide context-based word embedding for programming artifacts. Relatively large open source software projects in open repositories, such as GitHub™ and SourceForge™, provide opportunities for creating new software development and analysis tools based on machine learning or deep learning. Research tasks such as code summarization, code semantic search, and application programming interface (API) discovery may be performed using such code repositories. The data in a software project may be mostly textual. There may be various textual data artifacts, i.e., programming artifacts, in a software project, such as source code files, header files, copybook documents, and technical and requirement documents. Deep learning techniques, such as recurrent neural networks (RNN) used for NLP, may be adapted to model and analyze programming artifacts.

Programming artifacts, such as source code, have specific structure, contexts, syntax, naming conventions, and semantics. Performing word embedding based on programming artifacts may require different techniques as opposed to word embedding that is performed based on natural language documents. Context based word embedding for programming artifacts may leverage relevant program static analysis data, such as naming convention analysis, keyword discovery, variable usage analysis, and business rule discovery in order to improve the performance of learning tasks that are based on word embedding. Various contextual data, such as statement and business rule usages of keywords, may be captured from programming artifacts. Based on the learned word embedding matrix, the semantic and syntactic similarity of keywords, and relationships with other keywords, may be calculated to improve the performance of subsequent learning tasks such as learning of programming language models.

Static code analysis is used for computer program debugging, and includes examining and analyzing source code without executing the programs. Static code analysis may provide an understanding of source code structure and ensure that the source code adheres to industrial quality standards. Static code analysis may be applied to programming artifacts to analyze and determine specific naming conventions, syntax, structures, and contexts. The results of the static code analysis may be used as a foundation to build a word embedding pipeline for tokens in programming artifacts.

Embodiments of context-based word embedding may include a naming convention dependent tokenizer. Naming conventions, which may be applied to names in the source code, such as variables, method names, and function names, make programs more understandable by making them easier to read. A determined naming convention may be utilized to perform specific tokenization for source code, in order to reduce an overall word embedding vocabulary size and improve efficiency. The tokens may be scored and ranked based on a manifest feature vector. A specific keyword discovery algorithm may be used to reduce the word embedding sample size, e.g., word embedding may be performed on a subset higher-ranked tokens (i.e., keywords) to improve embedding efficiency. The manifest feature vector that is used to rank the tokens may also be used in the subsequent word embedding process. A programming artifacts context generator may be applied to the determined keywords. Keywords in programming artifacts may have different specific contexts, such as two keywords occurring in a same type of statement (conditional statement, computational statement, etc.), being used together to implement a same business rule, or having a common prefix or suffix in the programming artifacts. The context generator generates context/keyword pair sets, and a multinomial contexts classifier use the generated context/keyword pair sets as training data for a neural network that determines the word embedding matrix for the programming artifacts. The word embedding matrix that is determined using context-based word embedding may be used to train an RNN that processes programming language artifacts.

Figure 2:
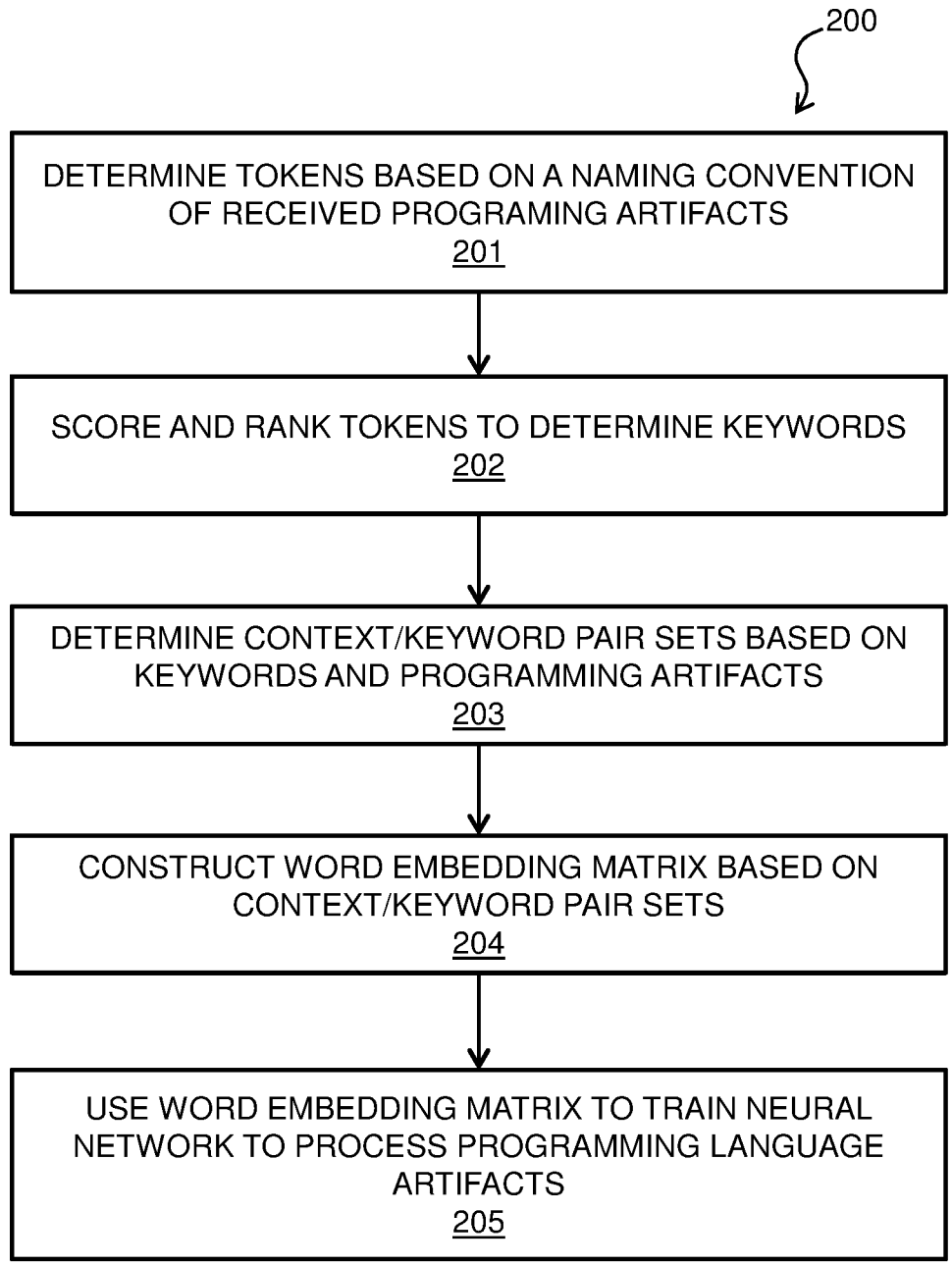
FIG. 2 is a flow diagram of a process for context-based word embedding for programming artifacts in accordance with one or more embodiments of the present invention.

Turning now to FIG. 1, a system 100 for context-based word embedding for programming artifacts is generally shown in accordance with one or more embodiments of the present invention. FIG. 2 illustrates a method 200 for context-based word embedding for programming artifacts that may be implemented in conjunction with one or more embodiments of system 100 of FIG. 1. FIGS. 1 and 2 will be described in conjunction with one another hereinafter. System 100 and method 200 may be implemented in conjunction with any appropriate computer system, such as computer system 300 of FIG. 3. System 100 includes a tokenizer module 101, a token scoring and ranking module 102, a context generation module 103, and a classification module 104. System 100 receives a corpus of programming artifacts 110, and outputs a word embedding matrix 150 that may be used to train, for example, a neural network that may be used to analyze programming artifacts. Embodiments of programming artifacts 110 are textual data that may include, but are not limited to, source code files, which may correspond to a software project and be in any appropriate computer programming language(s), header files, copybook files, and technical and requirement documents related to the software project.

In block 201 of method 200, tokenizer module 101 receives a corpus of programming artifacts 110, and determines a set of tokens 113 based on the programming artifacts 110. Determination of the tokens 113 in block 201 may include static code analysis of the programming artifacts 110. The tokenizer module 101 includes a naming convention dependent tokenizer. Tokenizer module 101 processes the programming artifacts 110 via separators analyzer 111 and regular expressions 112 to determine the set of tokens 113. Words in the software project (such as names, terms, phrases, identifiers, and variables) may follow particular naming conventions (such as "getPatientCost"), and may be relatively long and unique, which may lead to relatively large vocabulary sizes and low frequencies of usage for individual words. In order to reduce the vocabulary size, the words in the source code may be broken up into smaller subwords for inclusion in tokens 113 by separators analyzer 111 and regular expressions 112 in tokenizer module 101.

The separators analyzer 111 may determine a naming convention that is used in programming artifacts 110. Because source code is developed, read, and shared by multiple people within a team or organization, naming conventions may be used in software development to increase readability of source code. Naming conventions may apply to variables, functions, classes and files in a software project. Adherence to a naming convention may facilitate communications among developers, reviewers and project managers with respect to what the source code does. Different naming conventions may be used in conjunction with particular programming languages or organizations.

The separators analyzer 111 analyzes the typographical conventions in programming artifacts 110, including the use of letter cases (upper case characters versus lower case characters) and symbol characters including but not limited to underscore, dot, and hyphen, to determine a naming convention of the programming artifacts 110. The naming convention may be selected from a predetermined set of naming conventions in some embodiments, including but not limited to camel case, kebab case, and snake case, by separators analyzer 111. The separators analyzer 111 may identify a separator that is used within words according to the naming convention of the programming artifacts 110. For example, a camel case naming convention may be identified based on upper case characters being used as separators within words, e.g., "getPatientName". A kebab case naming convention may be identified based on dashes being used as separators within words, e.g., "get-patient-name". A snake case naming convention may be identified based on underscores being used as separators within words, e.g., "patient_name". Any appropriate character(s) may be identified as separators by separators analyzer 111 in various embodiments. In some embodiments, different files in programming artifacts 110 may follow different naming conventions; separators analyzer 111 may detect multiple naming conventions for the programming artifacts 110 in such embodiments.

Regular expressions 112 are generated by separators analyzer 111 based on the identified separator(s) corresponding to a naming convention of programming artifacts 110. For example, for embodiments in which programming artifacts 110 conform to a kebab case naming convention, regular expressions 112 may include "[\\w\\-|_|&]+|--+". Regular expressions 112 are applied to programming artifacts 110 to break up words in programming artifacts 110 into constituent subwords for inclusion in tokens 113. For example, the word "getPatientName" may be broken up into subwords "get", "patient", and "name". Each subword may be present in multiple words, such that the vocabulary size represented by tokens 113 may be reduced and the frequencies of individual tokens that are included in tokens 113 may be relatively high.

In some embodiments, individual tokens of tokens 113 may each include a single subword. In some embodiments, n-gram phrases (e.g., multiple words) may also be identified by regular expressions 112 and included in tokens 113. N-gram phrases (e.g., "Patient Name") having a relatively high word frequency (e.g., higher than a threshold) or term frequency-inverse document frequency (TFxIDF) values in programming artifacts 110 may be identified by tokenizer module 101 and included in tokens 113.

In block 202 of method 200 of FIG. 2, token scoring and ranking module 102 receives tokens 113 from tokenizer module 101, and scores and ranks the tokens 113 to determine keywords 130. Token scoring and ranking module 102 includes feature extractor 120, which receives tokens 113 and generates manifest feature vector 121 based on tokens 113 and programming artifacts 110. Manifest feature vector is provided to scoring and ranking module 122, which outputs keywords 130. There may be a relatively large number of tokens 113 received by token scoring and ranking module 102, depending on the size of programming artifacts 110. For example, for programming artifacts 110 corresponding to an enterprise-level software project, there may be tens of thousands of programming artifacts 110 containing millions of tokens. Some tokens of tokens 113 may be relatively important, e.g., tokens comprising business terms or business implementation names (e.g., "patientId") while some tokens of tokens 113 may be relatively unimportant words such as reserved program keywords (e.g., "public" or "main" in source code that is written in Java), or stop words such as "the", "a", or "of". Feature extractor 120 may extract features for each token of tokens 113 from programming artifacts 110 for inclusion in manifest feature vector 121. For example, feature extractor 120 may identify any usages of a token "Patient Id" in programming artifacts 110 for inclusion in manifest feature vector 121. In embodiments in which programming artifacts 110 are healthcare related, the token "Patient Id" may be determined to have a relatively high frequency (i.e., be used in many programming artifacts) in the application source code. In addition, the token "Patient Id" may be defined in a copybook or header file of the programming artifacts 110, and be determined to be similar to a database table called "PATIENT", Such features of "Patient Id" may be included in manifest feature vector by feature extractor 120 and analyzed by scoring and ranking module 122.

Programming language-independent features and programming language dependent features may be identified by embodiments of feature extractor 120. The programming language independent features may include token characteristics such as term length, term frequency, document frequency, first appearance, and TFxIDF. The programming language dependent features may be determined based on the syntax, styles, and conventions of the particular programming language of programming artifacts 110. Identification of usage of a token in specific statement types (e.g., conditional, file input/output (I/O), database I/O, computational, and structured query language) may increase a token's importance based on programming language dependent features. The programming language dependent features may also include token characteristics such as similarity to database table names or column names, similarity to user interface labels, and similarity to confirmed business terms. The manifest feature vector is extracted from programming artifacts 110 by feature extractor 120 based on tokens 113, and may be populated with programming language dependent features and programming language independent features that are identified by feature extractor 120 for each of the tokens 113 based on programming artifacts 110.

Manifest feature vector 121 is received by scoring and ranking module 122, which analyzes the data in manifest feature vector 121 to rank the tokens 113, and determines a subset of tokens 113 that are highest ranked tokens to be included in keywords 130. In some embodiments, scoring and ranking module 122 may include a trained classifier comprising a logistic regression model. The output of the logistic regression model may be the likelihood of an input (e.g., a token) being a binary target variable, e.g., being "Keyword" or "Not keyword". In some embodiments, the scoring and ranking module 122 may rank all of tokens 113 based on their keyword likelihood as determined based on manifest feature vector 121, and may determine a highest ranked subset of tokens 113 for inclusion in keywords 130. Any appropriate number of tokens 113 may be selected for inclusion in keywords 130 by scoring and ranking module 122 in various embodiments.

In block 203 of method 200 of FIG. 2, context generation module 103 receives keywords 130 from token scoring and ranking module 102, and determined context/keyword pair sets 135 based on the keywords 130 and programming artifacts 110. Context generation module 103 includes context generator 134, which includes statement parser 131, business rule discovery 132, and prefix/suffix analyzer 133 that analyze programming artifacts 110 for specific types of contextual information based on keywords 130. Context generator outputs a set of context/keyword pair sets 135 to classification module 104 based on the analysis performed by statement parser 131, business rule discovery 132, and prefix/suffix analyzer 133.

The statement parser 131 may identify any keywords of keywords 130 that occur in the same statement context in programming artifacts 110 based on the syntax and structure of the programming language(s) that are used in programming artifacts 110. For example, conditional statements, computational statements, file I/O statements, database I/O statements, structured query language statements, method/function scope, and file/package scope may be identified by statement parser 131. For an example COBOL statement "MOVE PATIENT-ID IN INPATIENT-DAILY-REC TO PATIENT-KEY, it may be determined by statement parser 131 that variables "PATIENT-ID", "INPATIENT-DAILY-REC", and "PATIENT-KEY" are in the same MOVE context. For another example COBOL statement "ADD MEDICATION-COST TO WS-MEDICATION-CHARGES", it may be determined by statement parser 131 that variables "MEDICATION-COST" and "WS-MEDICATION-CHARGES" are in the same ADD context. For another example COBOL statement "IF MEDICATION COST IN INPATIENT-TREATMENT-REC NOT NUMERIC", it may be determined by statement parser 131 that variables "MEDICATION-COST" and "INPATIENT-TREATMENT-REC" are in the same IF context.

Business rule discovery 132 may determine whether any of keywords 130 are used together to implement a single business rule. Business rules and implementation names corresponding to the programming artifacts 110 may be received from any appropriate business rule discovery engine. Business rule discovery 132 identifies sequences of code snippets that are executed together to implement a business rule, and the keywords that occur in those code snippets may be considered as within the same business rule context. A business rule may include a business decision that evaluates one or more business term values and executes a sequence of actions with a result, for example, "Extended Credit limit on Credit card for certain customer profiles: When a customer is above age 45 and his Annual salary is above 50K and his Credit score is above 78, then allow extended Credit limit up to 20% of his annual salary". Based on this example business rule, keywords such as "Customer-Age", "Annual-Salary", and "Credit-Score", may be determined by business rule discovery 132 to be in the same business rule context.

Prefix/suffix analyzer 133 may determine whether any two keywords of keywords 130 are used with the same prefixes and/or suffixes in programming artifacts 110. Prefixes and suffixes may be used to identify the usage scope or type of variables. For example, a set of variables such as "DB2-Patient-Id", "DB2-Patient-Cost", "DB2-Medication- Cost" may indicate that the three variables are each related to database columns, such that keywords such as "patient Id", "patient cost", and "medication cost" may be considered to be within the same database I/O context.

The context generator 134 determines any contextual information, including one or more context types, for each pair of keywords 130 in programming artifacts 110 based on statement parser 131, business rule discovery 132, and prefix/suffix analyzer 133, and outputs context/keyword pair sets 135. Context/keyword pair sets 135 may include a relatively large list of paired keywords labeled with their co-occurred context type(s) (as identified by any of statement parser 131, business rule discovery 132, and prefix/suffix analyzer 133). The context types may include, but are not limited to, a type of statement in which the keyword pair co-occurs in programming artifacts 110; that the keyword pair co-occurs in a business rule corresponding to programming artifacts 110, and the keyword pair shares a common prefix or suffix in programming artifacts 110. For example, for each pair of keywords of keywords 130, an input to context generator 134 may be "(Keyword1, Keyword2)" and an output may be "ContextType". The training data that comprises context/keyword pair sets 135 is provided to classification module 104 as training data for constructing of word embedding matrix 150.

In block 204 of method 200 of FIG. 2, classification module 104 receives context/keyword pair sets 135 as training data that is used to train a latent embedding matrix 140 that is used to construct a word embedding matrix 150. Classification module 104 comprises a multinomial contexts classifier 142. Vectorization module 141, classifier 142, and backpropagation and update module 143 train the weights in latent embedding matrix 140 using context/keyword pair sets 135 as training data to a word embedding matrix 150 via stack module 144. In latent embedding matrix 140, each row vector may represent the embedding vector for a respective keyword of keywords 130. The latent embedding matrix 140 may be initialized randomly, and the vectorization module 141, classifier 142, and backpropagation and update module 143 may learn to differentiate the meaning of the keywords in the latent embedding matrix 140 using the training data comprising context/keyword pair sets 135. In some embodiments, each keyword of keywords 130 may be converted into a one-hot vector by vectorization module 141 and multiplied by the latent embedding matrix 140 by classifier 142 to determine a respective latent embedding vector with a predefined shape for the keyword. For example, a training input shape may be "(KeywordVector1, KeywordVector2)" and the training output shape may be "ContextType", where ContextType is a multinomial label discovered in a previous iteration of the training. The context/keyword pair sets 135 may be inserted into multinomial contexts classifier 142, which may be a logistic regression or neural network, to calculate an estimation error. The estimation error is provided to backpropagation and update module 143 to update KeywordVector1 and KeywordVector2 in latent embedding matrix 140. With a relatively large amount of training data (i.e., context/keyword pair sets 135) provided, a converged latent embedding matrix 140 may be determined.

In some embodiments, stack module 144 may combine the converged latent embedding matrix 140 with the manifest feature vector 121 to determine the word embedding matrix 150 that is output by system 100. The values in the manifest feature vector 121 are fixed based on the corpus of programming artifacts 110, and are not updated by backpropagation and update module 143. In block 205 of method 200 of FIG. 2, the word embedding matrix 150 may be used to train an RNN to process programming artifacts comprising source code. The trained RNN may process any appropriate programming language artifacts that include source code in a manner analogous to applying NLP to natural language documents. Because the trained RNN includes contextual information that was extracted from programming artifacts 110 by system 100, embodiments of the trained RNN may perform relatively accurate processing of other programming language artifacts.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
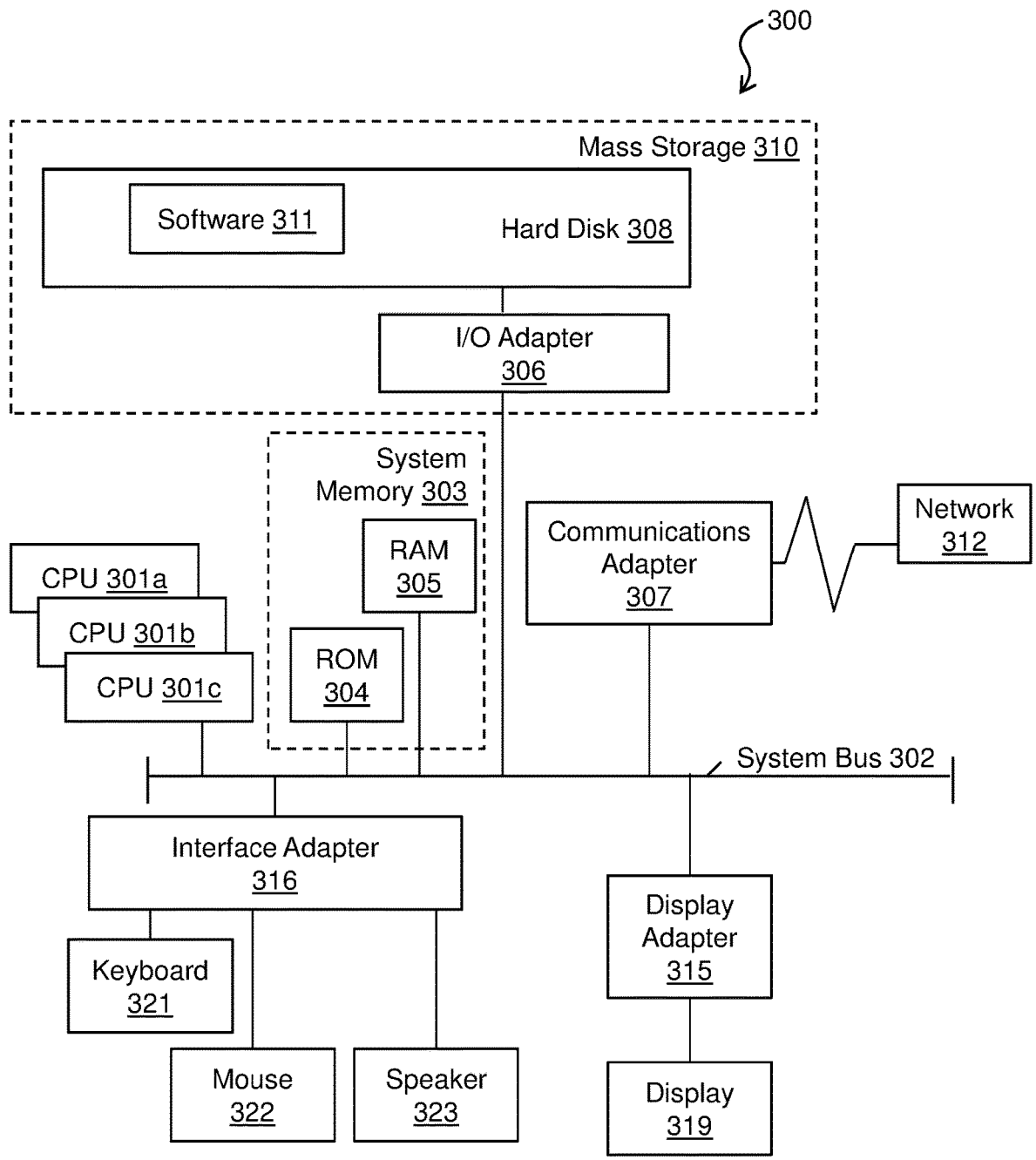
FIG. 3 is a block diagram of an example computer system for use in conjunction with one or more embodiments of context-based word embedding for programming artifacts.

Turning now to FIG. 3, a computer system 300 is generally shown in accordance with an embodiment. The computer system 300 can be an electronic, computer framework comprising and/or employing any number and combination of computing devices and networks utilizing various communication technologies, as described herein. The computer system 300 can be easily scalable, extensible, and modular, with the ability to change to different services or reconfigure some features independently of others. The computer system 300 may be, for example, a server, desktop computer, laptop computer, tablet computer, or smartphone. In some examples, computer system 300 may be a cloud computing node. Computer system 300 may be described in the general context of computer system executable instructions, such as program modules, being executed by a computer system. Generally, program modules may include routines, programs, objects, components, logic, data structures, and so on that perform particular tasks or implement particular abstract data types. Computer system 300 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 300 has one or more central processing units (CPU(s)) 301a, 301b, 301c, etc. (collectively or generically referred to as processor(s) 301). The processors 301 can be a single-core processor, multi-core processor, computing cluster, or any number of other configurations. The processors 301, also referred to as processing circuits, are coupled via a system bus 302 to a system memory 303 and various other components. The system memory 303 can include a read only memory (ROM) 304 and a random access memory (RAM) 305. The ROM 304 is coupled to the system bus 302 and may include a basic input/output system (BIOS), which controls certain basic functions of the computer system 300. The RAM is read-write memory coupled to the system bus 302 for use by the processors 301. The system memory 303 provides temporary memory space for operations of said instructions during operation. The system memory 303 can include random access memory (RAM), read only memory, flash memory, or any other suitable memory systems.

The computer system 300 comprises an input/output (I/O) adapter 306 and a communications adapter 307 coupled to the system bus 302. The I/O adapter 306 may be a small computer system interface (SCSI) adapter that communicates with a hard disk 308 and/or any other similar component. The I/O adapter 306 and the hard disk 308 are collectively referred to herein as a mass storage 310.

Software 311 for execution on the computer system 300 may be stored in the mass storage 310. The mass storage 310 is an example of a tangible storage medium readable by the processors 301, where the software 311 is stored as instructions for execution by the processors 301 to cause the computer system 300 to operate, such as is described herein below with respect to the various Figures. Examples of computer program product and the execution of such instruction is discussed herein in more detail. The communications adapter 307 interconnects the system bus 302 with a network 312, which may be an outside network, enabling the computer system 300 to communicate with other such systems. In one embodiment, a portion of the system memory 303 and the mass storage 310 collectively store an operating system, which may be any appropriate operating system, such as the z/OS or AIX operating system from International Business Machines Corporation, to coordinate the functions of the various components shown in FIG. 3.

Additional input/output devices are shown as connected to the system bus 302 via a display adapter 315 and an interface adapter 316 and. In one embodiment, the adapters 306, 307, 315, and 316 may be connected to one or more I/O buses that are connected to the system bus 302 via an intermediate bus bridge (not shown). A display 319 (e.g., a screen or a display monitor) is connected to the system bus 302 by a display adapter 315, which may include a graphics controller to improve the performance of graphics intensive applications and a video controller. A keyboard 321, a mouse 322, a speaker 323, etc. can be interconnected to the system bus 302 via the interface adapter 316, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 3, the computer system 300 includes processing capability in the form of the processors 301, and, storage capability including the system memory 303 and the mass storage 310, input means such as the keyboard 321 and the mouse 322, and output capability including the speaker 323 and the display 319.

In some embodiments, the communications adapter 307 can transmit data using any suitable interface or protocol, such as the internet small computer system interface, among others. The network 312 may be a cellular network, a radio network, a wide area network (WAN), a local area network (LAN), or the Internet, among others. An external computing device may connect to the computer system 300 through the network 312. In some examples, an external computing device may be an external webserver or a cloud computing node.

It is to be understood that the block diagram of FIG. 3 is not intended to indicate that the computer system 300 is to include all of the components shown in FIG. 3. Rather, the computer system 300 can include any appropriate fewer or additional components not illustrated in FIG. 3 (e.g., additional memory components, embedded controllers, modules, additional network interfaces, etc.). Further, the embodiments described herein with respect to computer system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining, by a processor, a plurality of keywords based on a corpus of programming artifacts, the corpus of programming artifacts comprising source code corresponding to a software project;
    determining a plurality of context/keyword pair sets based on the plurality of keywords and the corpus of programming artifacts, wherein each context/keyword pair set of the plurality of context/keyword pair sets comprises a first keyword, a second keyword, and a context type corresponding to a co-occurrence of the first keyword and the second keyword in the corpus of programming artifacts; and
    constructing a word embedding matrix based on the plurality of context/keyword pair sets,
    wherein constructing the word embedding matrix based on the plurality of context/keyword pair sets comprises:
        training a latent embedding matrix based on the plurality of context/keyword pair sets;
        creating a manifest feature vector based on the plurality of context/keyword pair sets and the corpus of programming artifacts; and
        combining the latent embedding matrix with the manifest feature vector corresponding to the corpus of programming artifacts to construct the word embedding matrix, wherein the combining includes ranking the plurality of context/keyword pair sets based on the manifest feature vector; and
    wherein the word embedding matrix is used to train a recurrent neural network (RNN) to process source code.

2. The method of claim 1, wherein determining the plurality of keywords comprises:
    determining a naming convention of the corpus of programming artifacts;
    determining a plurality of tokens based on the determined naming convention;
    constructing a manifest feature vector based on the plurality of tokens and the corpus of programming artifacts;
    ranking the plurality of tokens based on the manifest feature vector; and
    selecting a subset of the plurality of tokens as keywords based on the manifest feature vector.

3. The method of claim 2, wherein the naming convention comprises one of camel case, kebab case, and snake case.

4. The method of claim 1, wherein the context type corresponds to a type of a statement in the source code of the corpus of programming artifacts, wherein the first keyword and the second keyword co-occur in the statement.

5. The method of claim 1, wherein the context type corresponds to a business rule corresponding to the corpus of programming artifacts, wherein the first keyword and the second keyword co-occur in the business rule.

6. The method of claim 1, wherein the context type corresponds to a common prefix or suffix of the first keyword and the second keyword in the corpus of programming artifacts.

7. A system comprising:
    a memory having computer readable instructions; and
    one or more processors for executing the computer readable instructions, the computer readable instructions controlling the one or more processors to perform operations comprising:
        determining a plurality of keywords based on a corpus of programming artifacts, the corpus of programming artifacts comprising source code corresponding to a software project;
        determining a plurality of context/keyword pair sets based on the plurality of keywords and the corpus of programming artifacts, wherein each context/keyword pair set of the plurality of context/keyword pair sets comprises a first keyword, a second keyword, and a context type corresponding to a co-occurrence of the first keyword and the second keyword in the corpus of programming artifacts; and constructing a word embedding matrix based on the plurality of context/keyword pair sets, wherein constructing the word embedding matrix based on the plurality of context/keyword pair sets comprises:

training a latent embedding matrix based on the plurality of context/keyword pair sets; and creating a manifest feature vector based on the plurality of context/keyword pair sets and the corpus of programming artifacts; and combining the latent embedding matrix with the manifest feature vector corresponding to the corpus of programming artifacts to construct the word embedding matrix, wherein the combining includes ranking the plurality of context/keyword pair sets based on the manifest feature vector; and wherein the word embedding matrix is used to train a recurrent neural network (RNN) to process source code.

8. The system of claim 7, wherein determining the plurality of keywords comprises:

determining a naming convention of the corpus of programming artifacts;

determining a plurality of tokens based on the determined naming convention;

constructing a manifest feature vector based on the plurality of tokens and the corpus of programming artifacts;

ranking the plurality of tokens based on the manifest feature vector; and selecting a subset of the plurality of tokens as keywords based on the manifest feature vector.

9. The system of claim 8, wherein the naming convention comprises one of camel case, kebab case, and snake case.

10. The system of claim 7, wherein the context type corresponds to a type of a statement in the source code of the corpus of programming artifacts, wherein the first keyword and the second keyword co-occur in the statement.

11. The system of claim 7, wherein the context type corresponds to a business rule corresponding to the corpus of programming artifacts, wherein the first keyword and the second keyword co-occur in the business rule.

12. The system of claim 7, wherein the context type corresponds to a common prefix or suffix of the first keyword and the second keyword in the corpus of programming artifacts.

13. A computer program product comprising a computer readable storage medium having program instructions embodied therewith, the program instructions executable by one or more processors to cause the one or more processors to perform operations comprising:

determining a plurality of keywords based on a corpus of programming artifacts, the corpus of programming artifacts comprising source code corresponding to a software project;

determining a plurality of context/keyword pair sets based on the plurality of keywords and the corpus of programming artifacts, wherein each context/keyword pair set of the plurality of context/keyword pair sets comprises a first keyword, a second keyword, and a context type corresponding to a co-occurrence of the first keyword and the second keyword in the corpus of programming artifacts; and constructing a word embedding matrix based on the plurality of context/keyword pair sets, wherein constructing the word embedding matrix based on the plurality of context/keyword pair sets comprises:

training a latent embedding matrix based on the plurality of context/keyword pair sets; and creating a manifest feature vector based on the plurality of context/keyword pair sets and the corpus of programming artifacts; and combining the latent embedding matrix with the manifest feature vector corresponding to the corpus of programming artifacts to construct the word embedding matrix, wherein the combining includes ranking the plurality of context/keyword pair sets based on the manifest feature vector; and wherein the word embedding matrix is used to train a recurrent neural network (RNN) to process source code.

14. The computer program product of claim 13, wherein determining the plurality of keywords comprises:

determining a naming convention of the corpus of programming artifacts;

determining a plurality of tokens based on the determined naming convention;

constructing a manifest feature vector based on the plurality of tokens and the corpus of programming artifacts;

ranking the plurality of tokens based on the manifest feature vector; and selecting a subset of the plurality of tokens as keywords based on the manifest feature vector.

15. The computer program product of claim 14, wherein the naming convention comprises one of camel case, kebab case, and snake case.

16. The computer program product of claim 13, wherein the context type corresponds to a type of a statement in the source code of the corpus of programming artifacts, wherein the first keyword and the second keyword co-occur in the statement.

17. The computer program product of claim 13, wherein the context type corresponds to a business rule corresponding to the corpus of programming artifacts, wherein the first keyword and the second keyword co-occur in the business rule.

18. The computer program product of claim 13, wherein the context type corresponds to a common prefix or suffix of the first keyword and the second keyword in the corpus of programming artifacts.

* * * * *